Sept. 20, 1971  F. A. EDMUNDS  3,606,023
WINE RACK
Filed Dec. 29, 1969  2 Sheets-Sheet 1
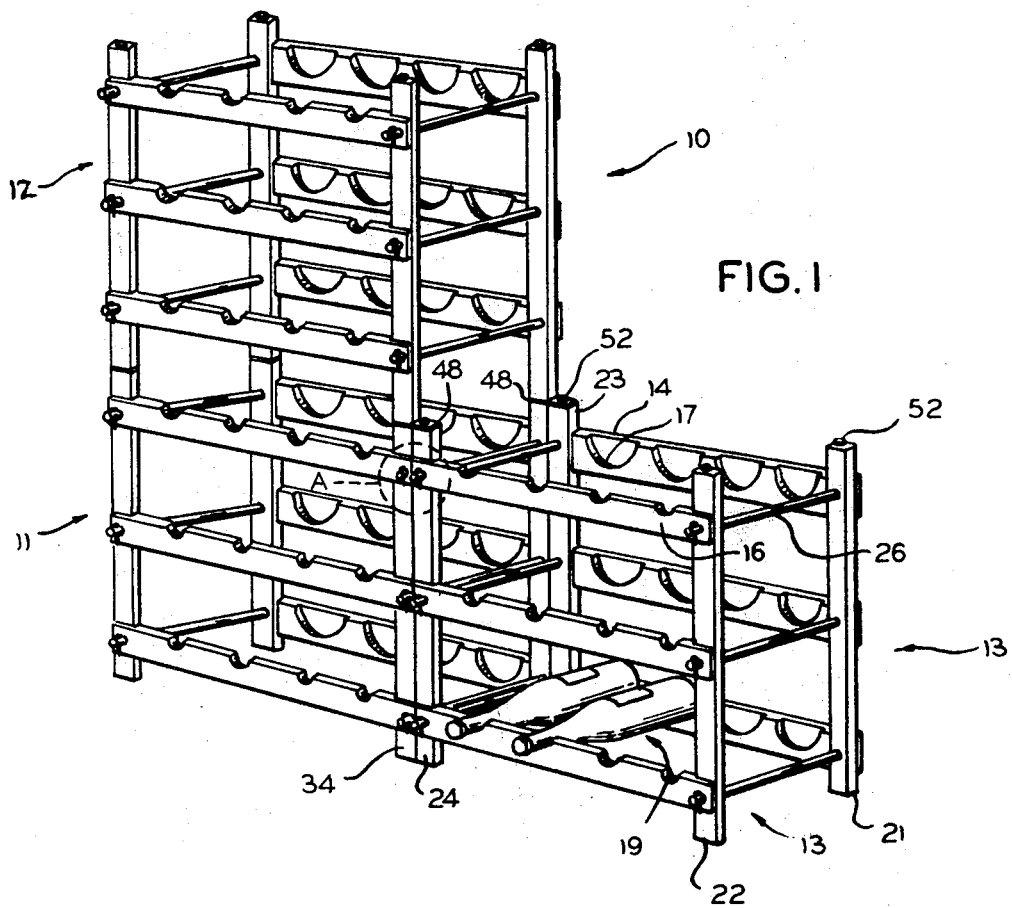
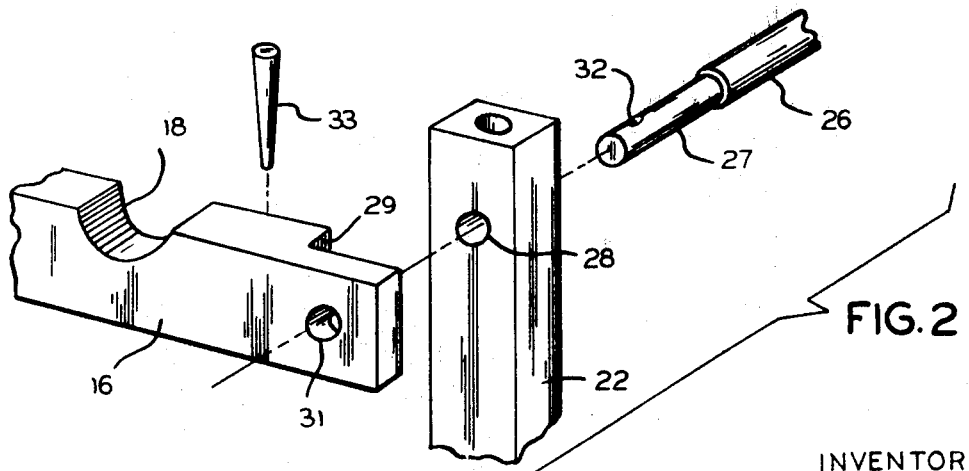
INVENTOR
FRANK A. EDMUNDS
BY Alter and Wein
ATTORNEYS Sept. 20, 1971   F. A. EDMUNDS   3,606,023
WINE RACK Filed Dec. 29, 1969   2 Sheets-Sheet 2

INVENTOR
FRANK A. EDMUNDS

BY *Alter and Weiss*
ATTORNEYS

United States Patent Office 3,606,023
Patented Sept. 20, 1971

3,606,023
WINE RACK
Frank A. Edmunds, 7920 S. Greenwood Ave.,
Chicago, Ill. 60619
Filed Dec. 29, 1969, Ser. No. 888,610
Int. Cl. A47b 73/00
U.S. Cl. 211—74                                                10 Claims

ABSTRACT OF THE DISCLOSURE

A sectional knock down rack that can be assembled without any tools. The individual sections are amenable to vertical stacking and to horizontal joining.

---

This invention relates to wine racks, and more particularly to stackable knock down type wine racks which can be assembled without the use of any tools. The wine racks are stackable horizontally and vertically so that individual sections can be joined to assemble a complete wine cellar as needed.

With the affluency of the present society, one avenue of both investment and status seeking is in the collection of fine wines. This normally starts in a modest manner wherein a few bottles of fine wines are collected by the amateur connoisseur. There is an immediate storing problem; i.e., where to keep the wine. It has been a normal practice for such collectors to buy ready made large wine racks. However, these large wine racks are uneconomical and look ludicrous with just a few bottles therein.

A more recent development has been the knock down type wine rack. This enables the purchaser to purchase a small wine rack which he himself assembles. Subsequently, as the wine collector's needs grow, he can purchase another wine rack and assemble the second wine rack. The problem involved with such knock down wine racks is that they have been relatively hard to assemble and require tools and the like for such assembly. In addition, they have not provided an expeditious method of joining or stacking the individual wine rack sections.

Accordingly, an object of this invention is to provide a knock down wine rack assembly which can be assembled without the use of any tools easily and efficiently.

A further object of this invention is to provide a wine rack assembly that is amenable to vertical stacking.

Yet, another object of this invention is to provide a wine rack assembly wherein separate sections of the wine rack assembly are amenable to horizontal joining.

Yet, a further feature of this invention is to provide a wine rack assembly that efficiently holds the wine bottles and can be built up into large wine racks from easily assembled sections.

A preferred embodiment of the wine rack assembly comprises knock down sections which require no tools for assembling. The knock down sections each comprise four corner uprights or standard members. The standard members have apertures therethrough for receiving transverse dowels therein between opposite ones of two pairs of the corner cross members. The transverse dowels are positioned in the horizontal plane and extend from front to rear. When the transverse dowels are in the standard members, the two pair of standard members form ladder-like assemblies. These ladder-like assemblies are joined by front and rear cross members which have holes in them for slipping over the dowels that extend beyond the front and rear of the standard members.

Means are provided on the front and rear cross members for receiving and retaining the wine bottles therein. Further, means are provided for maintaining the dowels in place without the necessity of using any tools. With the cross members slipped over the transverse dowels and maintained in place, a rigid sectional wine rack is provided.

Means are provided at the tops and bottoms of the standard members for enabling vertical stacking of the sections. Means are further provided at the tops of the standard members for horizontally joining the sections positioned in side by side relationship.

The foregoing and other objects and advantages of this invention and the manner of obtaining them will become more apparent and the invention itself will be best understood by reference to the following description of embodiments of the invention taken in conjunction with the accompanying drawings wherein:

FIG. 1 is a pictorial view of sections of the wine rack assembled vertically and horizontally;

FIG. 2 is an exploded view of one corner section of the wine rack showing how it is maintained in assembly;

Figure 4:
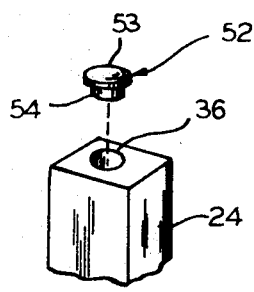
FIG. 4 is a partial pictorial view of the top of one upright standard member of the improved wine racks.

Similar characters of reference indicate corresponding parts and features throughout the several views. Referring now to the drawings, the character 10 generally shows an assembled wine rack comprised of several wine rack sections; namely, sections 11, 12 and 13.

Each section of the improved wine rack is comprised of means for retaining wine bottles in a prone position. More particularly, a rear cross member 14 is provided oppositely disposed from a front cross member, such as cross member 15.

Means are provided in the rear cross members to conform to the bottom of the bottle. More particularly, recesses, such as recess 17, are routed onto the front of the rear cross members.

Means are provided in the front cross members for conforming to and receiving the neck of the stored wine bottles. More particularly, a groove, such as groove 18, is provided in the front cross members immediately opposite recesses in the rear cross members.

Samples of the bottles as they are held in the rack are shown in FIG. 1 at 19 at the bottom of rack section 13. The rack sections further each comprise standard members or uprights, such as uprights 21 and 22 oppositely disposed from each other at one end of rack 13. On the other end of rack 13 are shown uprights 23 and 24, for example. The uprights provide the means for holding rear cross members vertically spaced apart from each other.

Means are provided for holding the uprights or standards oppositely disposed, parallely spaced apart from each other, and at the same time for holding the rear and front cross members to the vertical uprights. More particularly, transverse dowel members, such as dowel member 26, are provided which extends from a rear standard member, such as standard member 21, to a front standard member, such as standard member 22.

As shown in FIG. 2, for example, the transverse dowel members have a smaller diameter at their ends than in their middle section. For example, end 27 of dowel member 26 has a smaller diameter than the main body section of dowel member 26. Apertures are provided extending through the upright members. An example of such apertures is aperture 28 in upright member 22. Aperture 28 is designed for receiving the smaller diameter dowel end 27 of dowel 26 so that the ends of the dowel members 26 extend through and beyond the upright 22.

The cross members are also shaped to conform to the standard members. Thus, where the standard member, such as standard member 22, is shown as being rectangularly shaped, then an edge of the cross member is shaped, such as at shoulders, shown as 29, to conform to the upright 22. A hole, such as aperture 31, is located in cross member 16 to be aligned with aperture 28 so that the transverse dowel member 26 in extending through aperture 28, also extends through hole 31.

Means are provided for fastening the transverse dowel members, the uprights and the cross members together. More particularly, the transverse dowel members, each have in their smaller diameter end sections, a hole substantially normal to the longitudinal axis and extending through the end section. For example, hole 32 extends through end section 27 of dowel 26.

A tapered peg 33 is provided, which fits into hole 32 and thereby holds cross member 16 so that its shaped shoulder 29 is juxtaposed contiguous to and abuts upright 22. With the transverse dowels in place, and with the pegs pushed into the holes at the ends of the dowels, the uprights and the transverse dowels along with front and rear cross members from a stable and solid wine rack section.

It should be understood, of course, that the uprights could have other shapes than rectangular and then to assure that a solid, stable unit were provided, the cross members would be machined out to conform to the upright members so as to provide a continuous abutting fit between the cross members and uprights. Similarly, while the transverse dowels are shown rounded, they could have other geometrical shapes.

Figure 3:
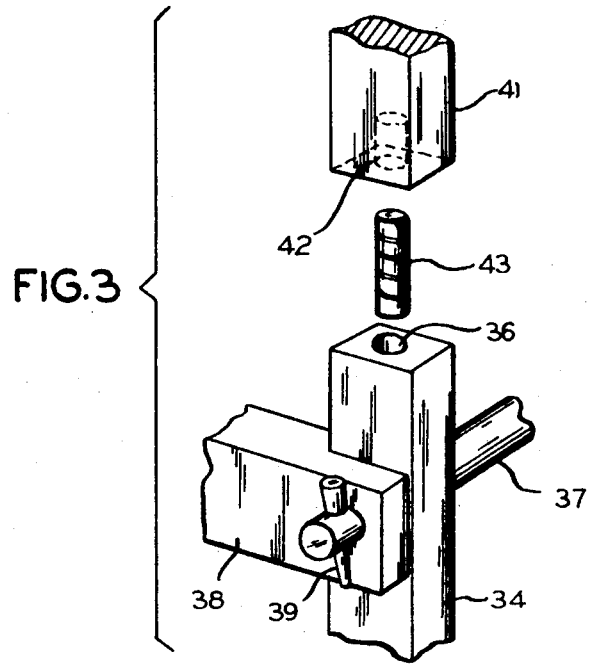
FIG. 3 is an exploded view of the vertical stacking means provided in the improved wine racks.
Figure 5:
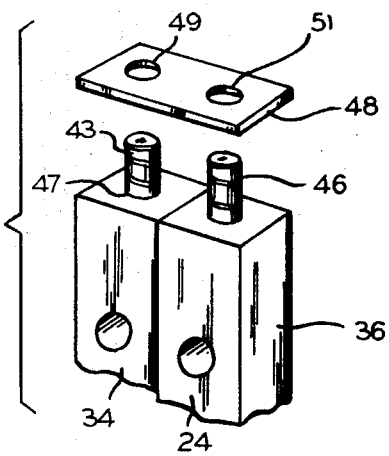
FIG. 5 shows the means for sidewise joining of the wine rack sections.

Means are provided for vertically stacking the wine rack sections. More particularly, as best shown in FIG. 3, for example, a bottom upright 34 of rack section 11 has at the top thereof a vertically extending axial aperture 36. It can be seen that the transverse dowel 37 extends through upright 34 and through front cross member 38 to receive the peg 39 so as to construct a stable corner section. The upright 41 of the top rack section 12 also has a vertical extending aperture 42 therein. Means, such as the cylindrical pin 43 fits into both apertures 36 and 42 simultaneously so that the bottom of upright 41 abuts the top of upright 34. The same arrangement is followed on each of the corner uprights of the top and bottom sections to stack the rack sections such as rack sections 11 and 12 together in stable assembly.

Means are provided for joining two separate wine rack sections in a horizontal side by side relationship. More particularly, two rack sections, such as sections 11 and 13, to be joined together are positioned in the side by side relationship having upright standard members 24 and 34 juxtaposed to each other. Means, such as a pair of dowel pins, 43 and 46, are placed into each of the apertures 47 and 36, respectively. A joining plate having a pair of spaced apart apertures 48 and 51 located so a as to simultaneously fit over each of the dowel pins 43 and 46, respectively are placed over those dowel pins. This is done at both corners where the uprights are juxtaposed to each other. The top rack can then be stacked vertically over the joining plate 48, if so desired. Otherwise, if a vertically stacked rack is not placed on top of rack section 13; then, instead of using a dowel pin, such as dowel pin 46 in hole 36, means, such as mushroom button 52, for example, are provided for covering the hole.

The mushroom button is best shown in FIG. 4 as fitting into hole 36 in upright 24. The mushroom pin is illustrated having a cap section 53 and main body or hole fitting section 54. The cap section has a larger diameter and extends arcuately upward from the hole fitting section 54. The mushroom caps are shown at the top of section 13 in FIG. 1 as caps 52.

Figure 6:
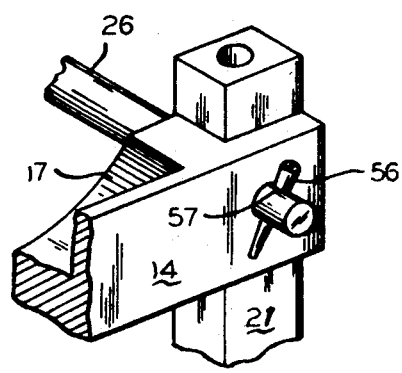
FIG. 6 shows a partial pictorial view of one top corner of a wine rack section completely assembled.

FIG. 6 shows a typical back corner in one of the sections, such as section 13, for example. This shows that the back corner is constructed and assembled in the same manner as are the front or forward corners. For example, the transverse dowel member 26 is shown as extending through standard member 21 and having a tapered peg 56 inserted into the hole 57 on the transverse dowel member 26 which holds rear cross member 14 contiguous to upright 21.

Figure 7:
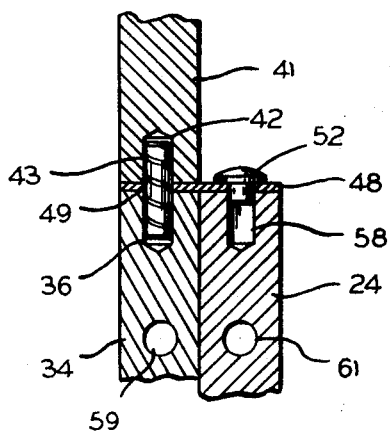
FIG. 7 is a sectional view of one corner of the wine rack showing the vertical stacking and horizontal joining.

FIG. 7 shows a corner section, such as the corner section circled within the broken line circle A in FIG. 1. Therein is shown upright member 41 of top section 12 held to upright members 34 of bottom section 11 by peg 43 which extends into both apertures 42 and 36. At the same time, a plate 48 extends across the top of upright members 34 and 24. The plate 48 is held in place by dowel pin 43 and mushroom button 52 extending through the apertures 49 and 51 in the plate and into the apertures 36, 43 and 58 of uprights 34, 41 and 24, respectively. The transverse dowel member receiving apertures 59 and 61 are also shown in the uprights 34 and 24, respectively.

In use, the rack is assembled by first taking front and rear corner upright members and joining them together with the transverse dowel members which are slipped through the apertures of a first corner upright member, for example, an upright which will serve as a front corner member. Then the rear corner member or upright standard is positioned so that the transverse dowels extend therethrough also. This is done to both pair of corner upright members to form two ladder-like sections. Then, for example, the rear cross members are positioned over the transverse dowel members extending through the corner upright standard members and subsequently the front cross members are positioned over the traverse dowel members extending through the front corner members. The tapered pegs are then put through the apertures in the ends of the dowel members so that a solid section is established. Then, as required, either mushroom button or dowel pins are placed in the top vertically extending aperture of the corner members. If required, a top section is stacked on top of a bottom section using the dowel pins. The stack can be made as high as required and joining plates can be used to join sections positioned beside the original section. Thus, the sectional wine rack can be assembled without any tools, can be stacked and joined to form as large a complete rack as required using the ladder-like assemblies of the rack sections. The top holes are finally closed up with the mushroom buttons to provide an aesthetically pleasing, attractive and utilitarian wine rack.

While the above principles and advantages of the invention have been described in connection with specific arrangements and apparatus, it is to be clearly understood that this description is made only by way of example and not as a limitation on the scope of the invention.

I claim:
1. An improved knock down wine rack for storing wine bottles therein,
said rack being generally a parallelopiped with an upright at each corner thereof,
a plurality of transverse dowels extending between the front and rear upright at each end of said rack,
means for joining said transverse dowels to said uprights to form end assemblies,
a plurality of front cross members extending between said front uprights,
a plurality of rear cross members oppositely disposed and parallel to said front cross members,
said rear cross members extending between said rear uprights to form said parallelopiped,
means including said transverse dowels for affixing said front cross members to said end assemblies,
means including said transverse dowels for affixing said rear cross members to said end assemblies, means on said cross members for resting the wine bottles thereon, and locking means including pin means for locking said affixed front and rear cross members in place.

2. The improved wine rack of claim 1 wherein said wine racks comprise means for horizontally stacking one of said wine racks on top of other of said wine racks.

3. The improved wine rack of claim 1 wherein means are provided for assembling said wine racks horizontally in a side by side relationship.

4. The improved wine rack of claim 1 wherein said means for joining said transverse dowels to said uprights includes a plurality of spaced apart holes in said uprights, said transverse dowels comprising a main body section and end sections, the peripheral dimensions of said main body section being larger than the peripheral dimensions of said end sections whereby only said end sections fit into said holes in said uprights.

5. The improved wine rack of claim 4 wherein said means for affixing said cross members to said end assemblies comprise end sections sufficiently long to extend through said uprights, holes in the ends of said cross members dimensioned to be slipped over said end sections where said end sections extend beyond said uprights.

6. The improved wine rack of claim 5 wherein said front and rear cross members each comprise shoulder means for abutting against said uprights to assure a more stable wine rack.

7. The improved wine rack of claim 2 wherein said means for horizontal stacking comprises axial holes at the ends of said uprights, pin means fitting into the axial holes on a bottom one of said wine racks and extending above the tops of said uprights into the axial holes at the bottom of a top one of said wine racks to fasten together said bottom and top wine racks in a stacking arrangement.

8. The improved wine rack of claim 3 wherein said vertical stacking means comprises axial holes in the ends of said uprights, pin means for fitting into said axial holes in adjoining uprights which are located in a side by side relationship, and plate means extending from the pin means of one of said uprights to the adjoining one of said uprights thereby horizontally assembling the side by side racks.

9. The improved wine rack of claim 6 wherein said locking means further comprises holes in said end sections normal to the axis of said transverse dowels, and wherein said locking pins are tapered to be placed into and removed from said normal holes without the necessity of utilizing any tools.

10. The improved wine rack of claim 9 wherein means are provided for covering said axial holes in the uprights, said means comprising mushroom pins having a cap section and a body section, and said body section being dimensioned to fit within the axial holes and said cap section being dimensioned to cover said axial holes.

References Cited

UNITED STATES PATENTS

| 85,208 | 12/1868 | Burrow | 211—74 |
| 3,160,278 | 12/1964 | Varkala | 211—74 |
| 1,755,960 | 4/1930 | Kohler | 249—216X |

FOREIGN PATENTS

| 30,319 | 2/1904 | France | 211—74 |
| 8,633 | 8/1907 | Great Britain | 211—74 |
| 20,359 | 5/1929 | Australia | 211—74 |

NILE C. BYERS, JR., Primary Examiner

U.S. Cl. X.R.

211—177